Figure 1:
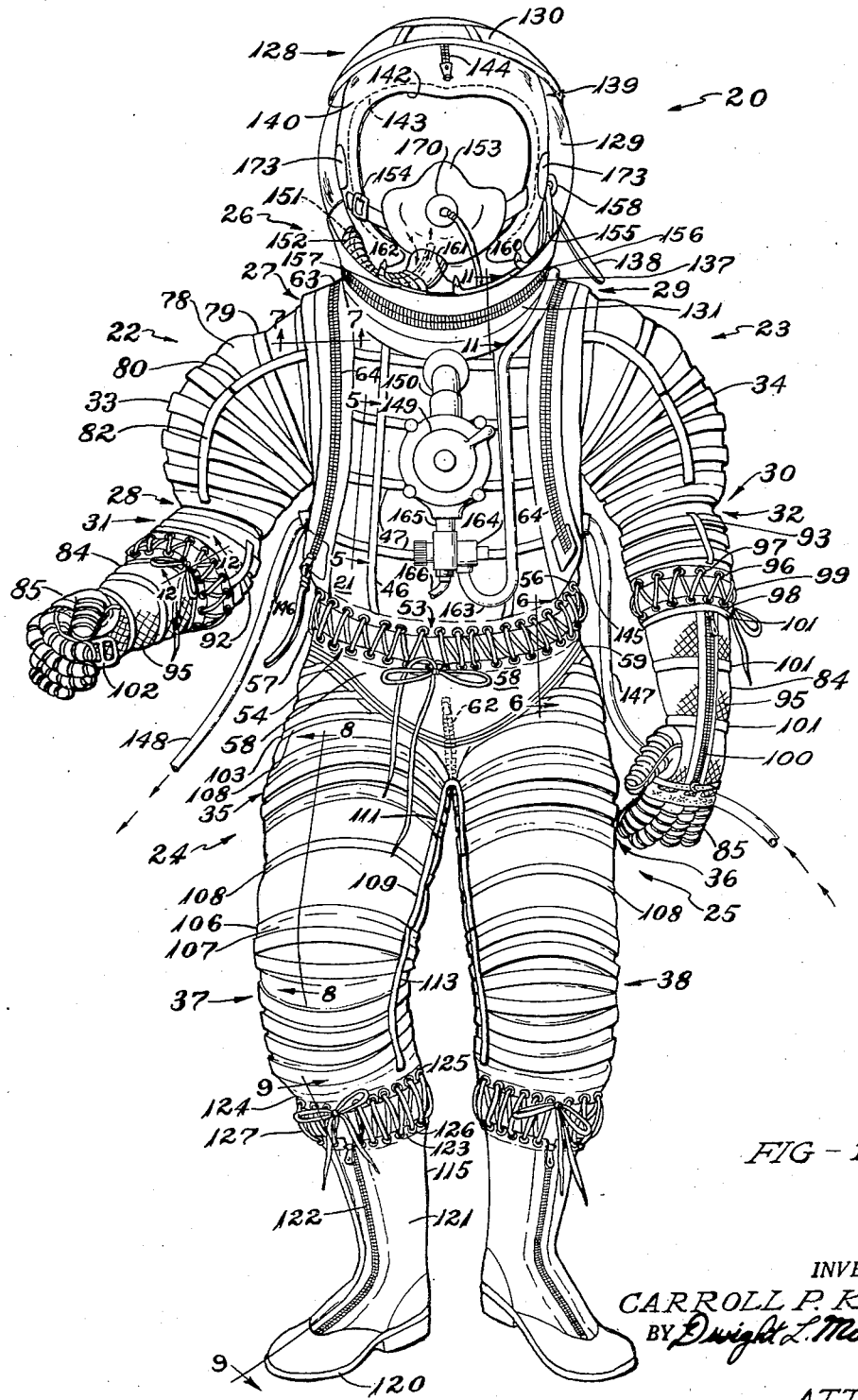

Dec. 27, 1960 C. P. KRUPP 2,966,155
OMNI-ENVIRONMENT INFLATABLE SUIT FOR HIGH ALTITUDE FLIGHT
Filed July 26, 1954 8 Sheets-Sheet 1

INVENTOR.
CARROLL P. KRUPP
BY Dwight L. Moody
ATTY.

Dec. 27, 1960  C. P. KRUPP  2,966,155
OMNI-ENVIRONMENT INFLATABLE SUIT FOR HIGH ALTITUDE FLIGHT
Filed July 26, 1954  8 Sheets-Sheet 3

INVENTOR.
CARROLL P. KRUPP
BY Dwight L. Moody
ATTY

Dec. 27, 1960　　　　　　　C. P. KRUPP　　　　　2,966,155
OMNI-ENVIRONMENT INFLATABLE SUIT FOR HIGH ALTITUDE FLIGHT
Filed July 26, 1954　　　　　　　　　　　　　8 Sheets-Sheet 5

INVENTOR.
CARROLL P. KRUPP
BY Dwight L. Moody
ATTY.

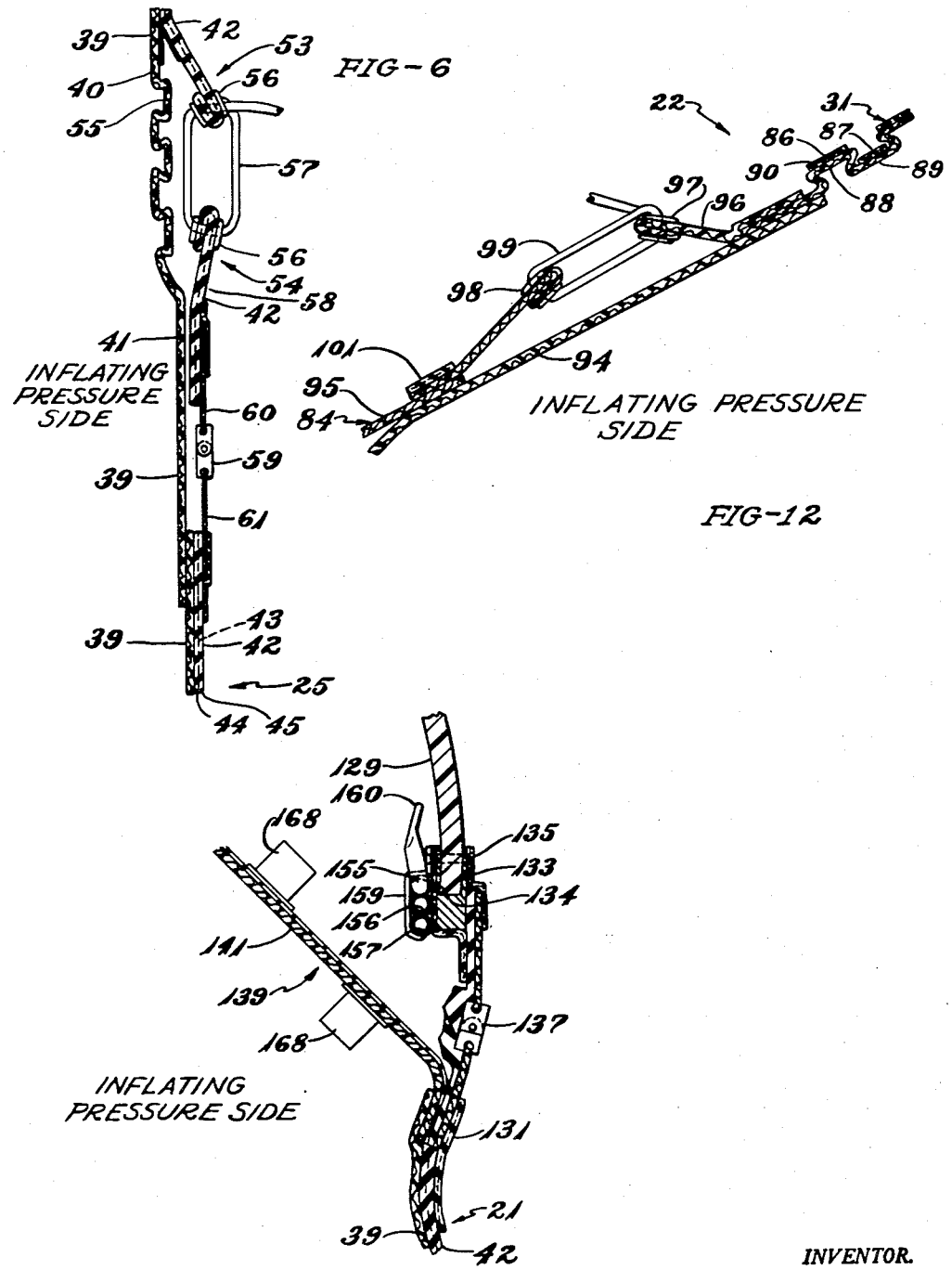

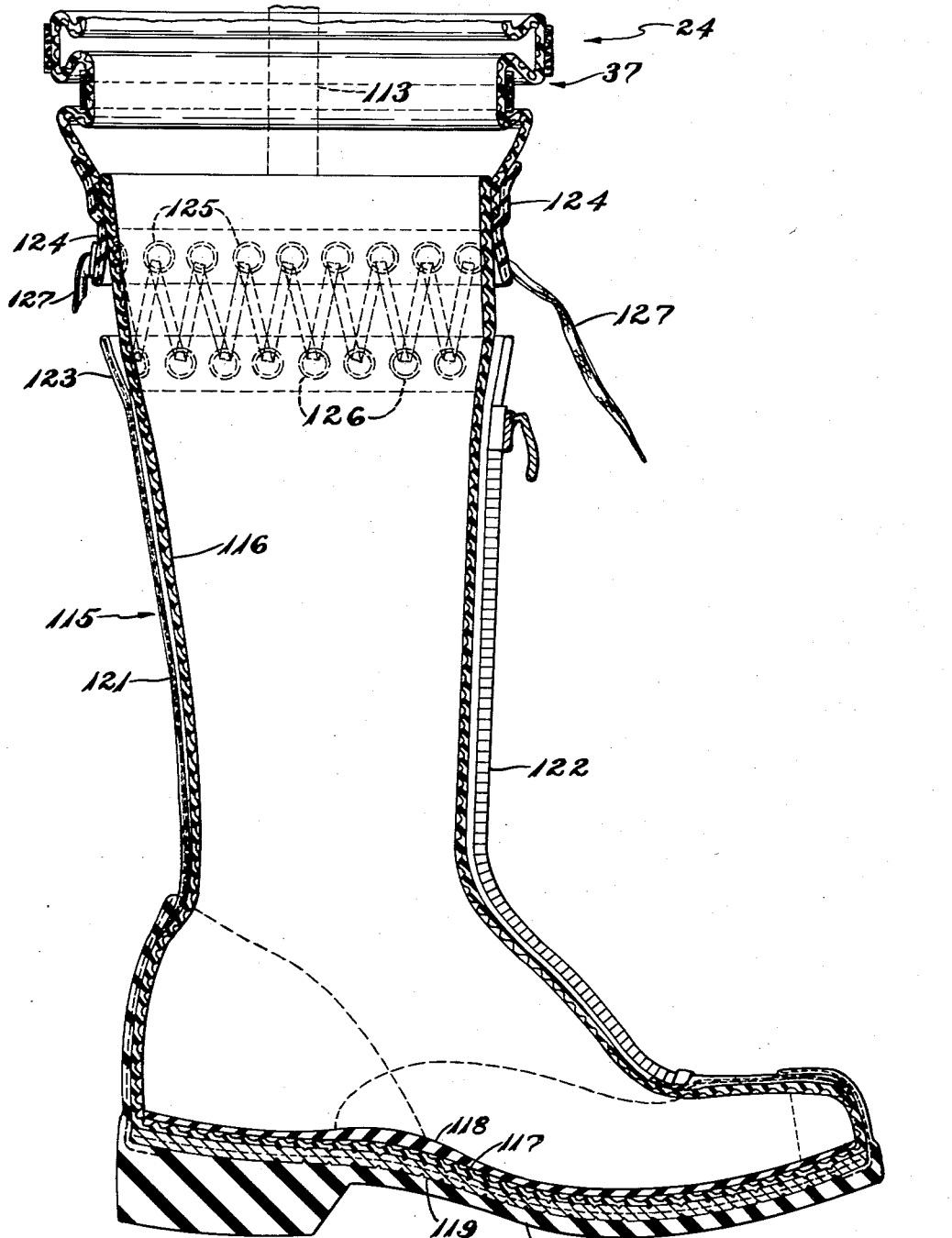

Dec. 27, 1960         C. P. KRUPP         2,966,155
OMNI-ENVIRONMENT INFLATABLE SUIT FOR HIGH ALTITUDE FLIGHT
Filed July 26, 1954         8 Sheets-Sheet 8

INVENTOR.
CARROLL P. KRUPP
BY Dwight L. Moody

ATTY

United States Patent Office 2,966,155
Patented Dec. 27, 1960

2,966,155

OMNI-ENVIRONMENT INFLATABLE SUIT FOR HIGH ALTITUDE FLIGHT

Carroll P. Krupp, Cuyahoga Falls, Ohio, assignor to The B. F. Goodrich Company, New York, N.Y., a corporation of New York Filed July 26, 1954, Ser. No. 445,649

13 Claims. (Cl. 128—144)

The invention relates to protective inflatable suits for pilots and other personnel of aircraft, and adapted to protect the wearer against the weather and other harmful exposure and also to provide an independent, sealed, atmospheric environment for the wearer to overcome the physiological and other hazards of flight at high altitudes such as 12 to 20 or more miles above sea level.

This application is a continuation-in-part of my copending application entitled "Inflatable Protective Suit for High Altitude Flight," Serial No. 387,168, filed October 20, 1953.

Objects of the invention are to provide an improved protective inflatable suit for high altitude flight purposes having provision for carrying its own atmosphere—oxygen, pressure, and air conditioning—so as to seal the whole body of the wearer from the adjacent outer atmosphere; to provide a full-pressurized flying suit having provision of a safe, low altitude, atmospheric omni-environment sealed and localized about the whole body of the wearer; to provide an inflatable flying suit adapted to protect the wearer against the effects of weather, extreme temperatures, ultra-violet rays, immersion in cold water and the like, and adapted to be worn for long periods of flight without objectionable discomfort; to provide for complete and extensive freedom of movement by the wearer; to provide for maximum bending and flexure of the wearer's torso, arms and legs together with substantial turning of his head; to provide for increased flexibility and durability of the suit as a whole; to provide for adjustability of the suit to accommodate different wearers and to restrain upward movement of the helmet relative to the wearer's head; to provide for compactness and minimum ballooning or bulging of the suit to facilitate its use in cockpits and other restricted spaces; to provide for increased cooling of the wearer by virtue of improved ventilation of the suit; to provide for avoiding objectionable fogging of the helmet; and to provide for increased strength of construction, light-weight, convenience of manufacturer and for effectiveness of operation.

These and other objects and advantages of the invention will be apparent from the following description.

Figure 2:
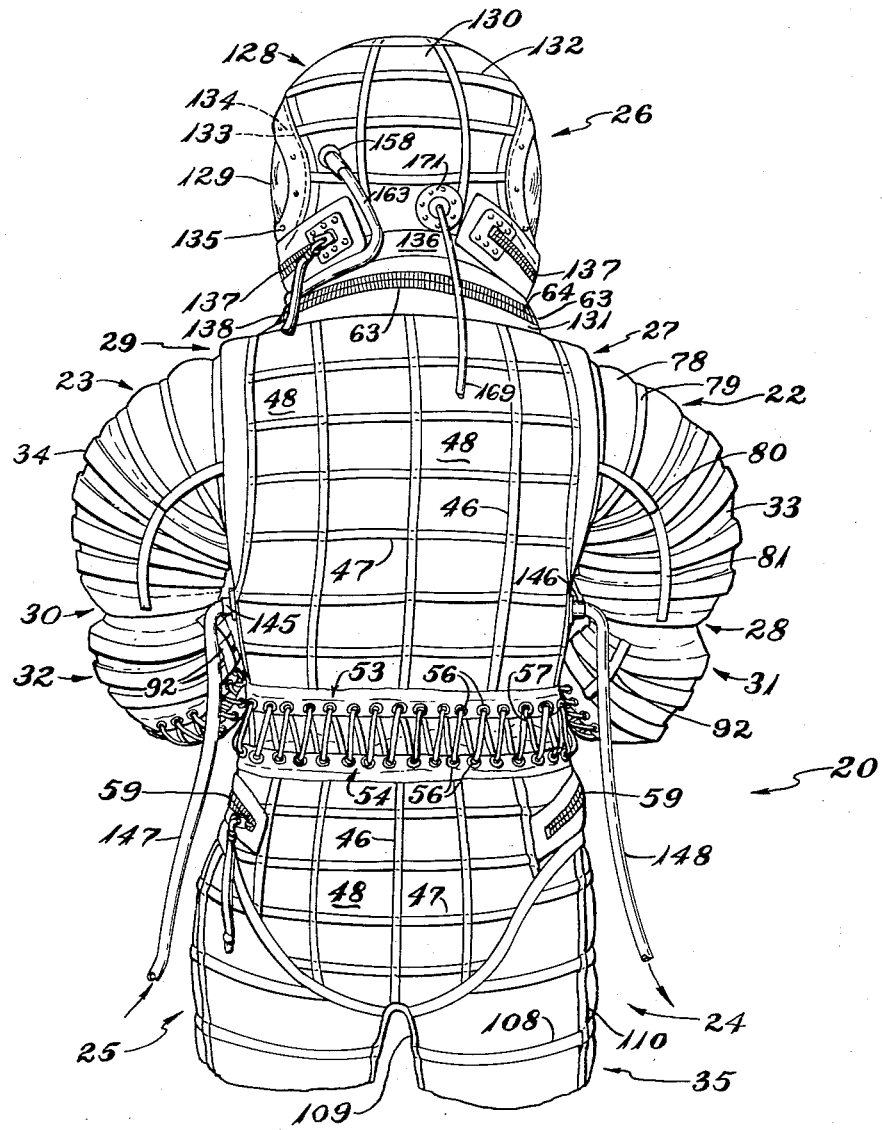
Figure 3:
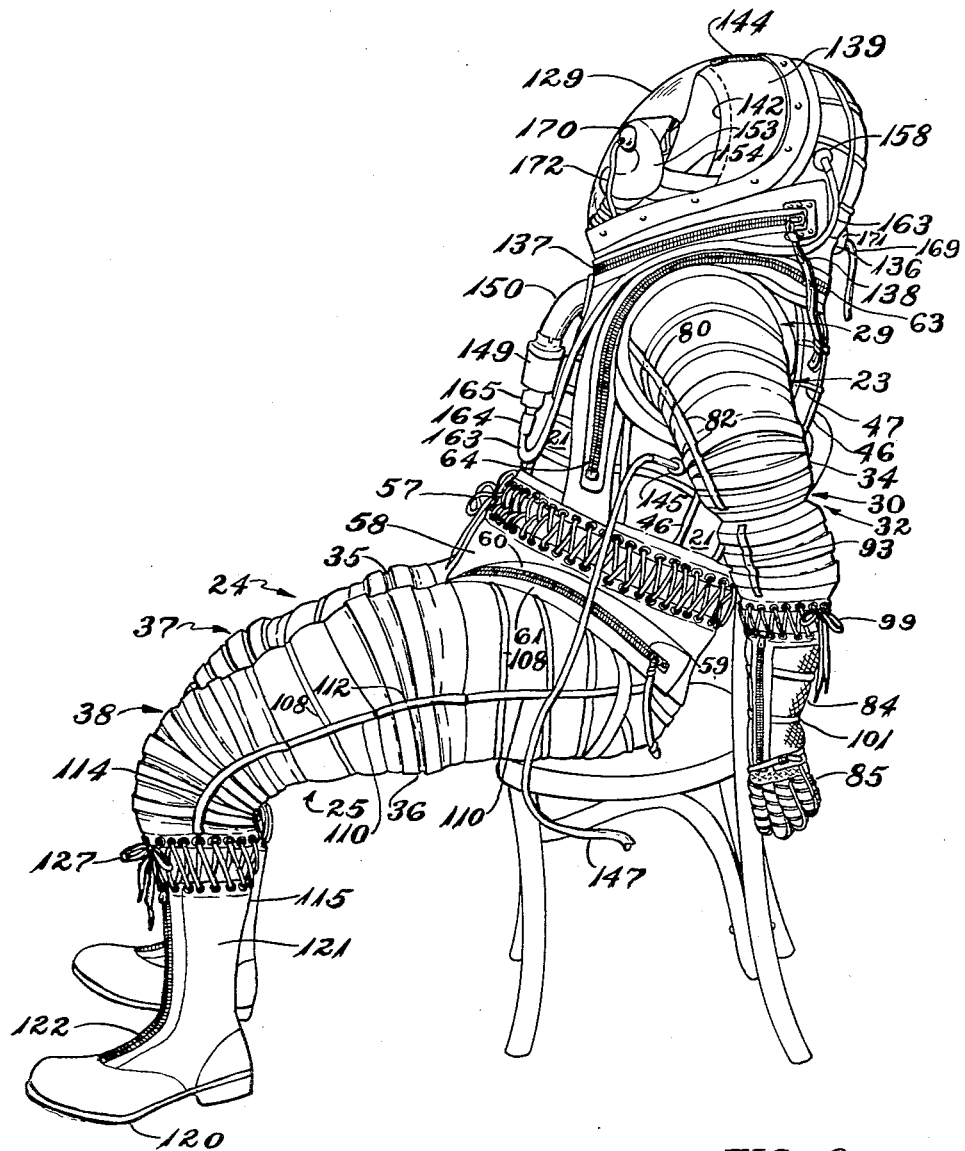
Figure 4:
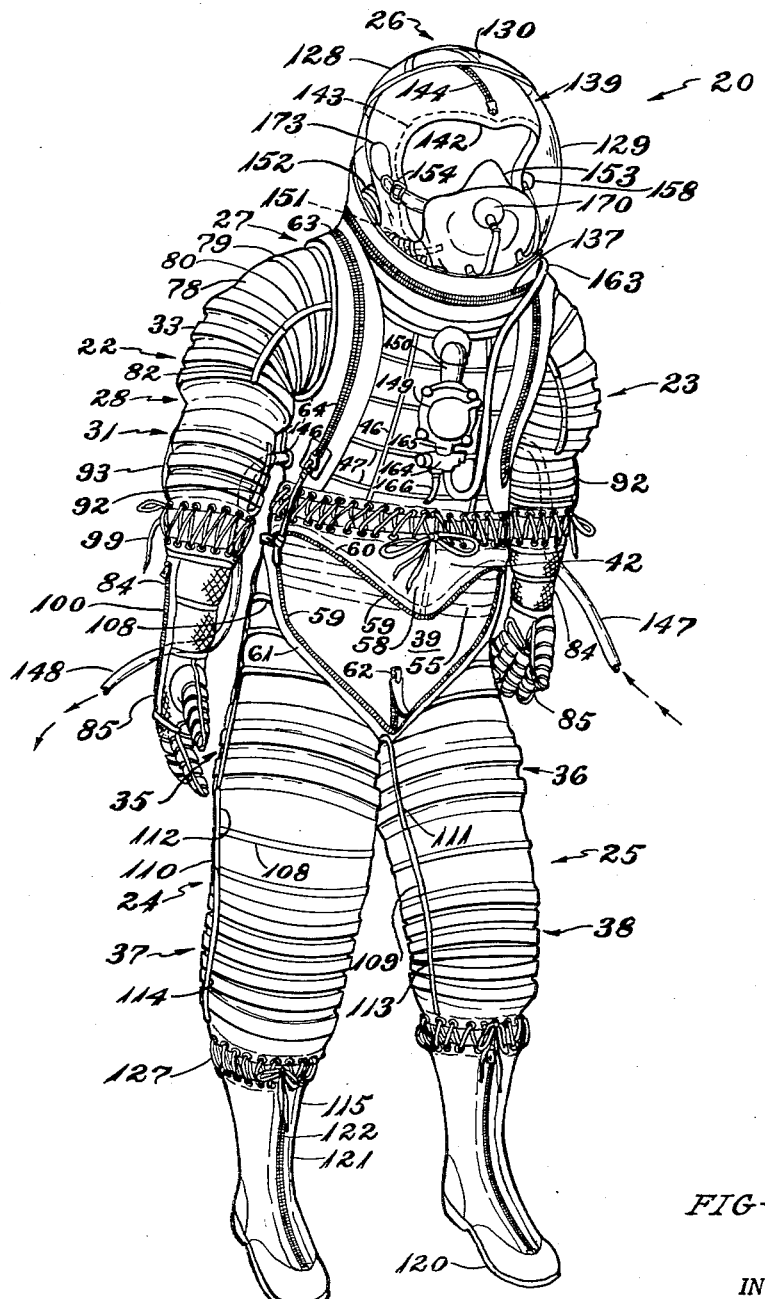
Figure 5:
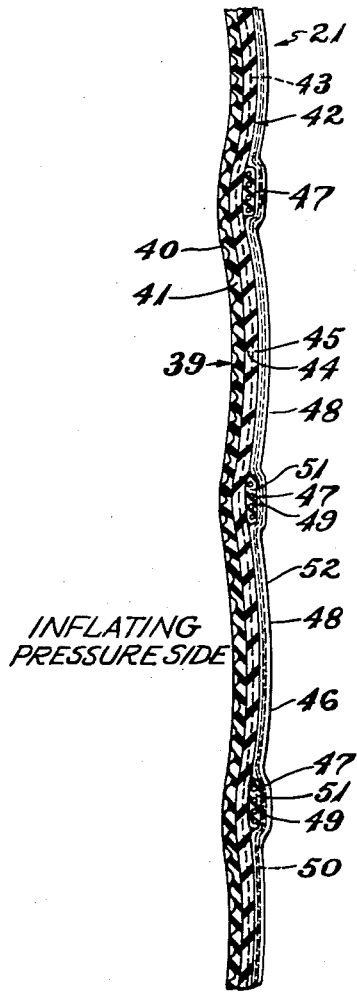
Figure 8:
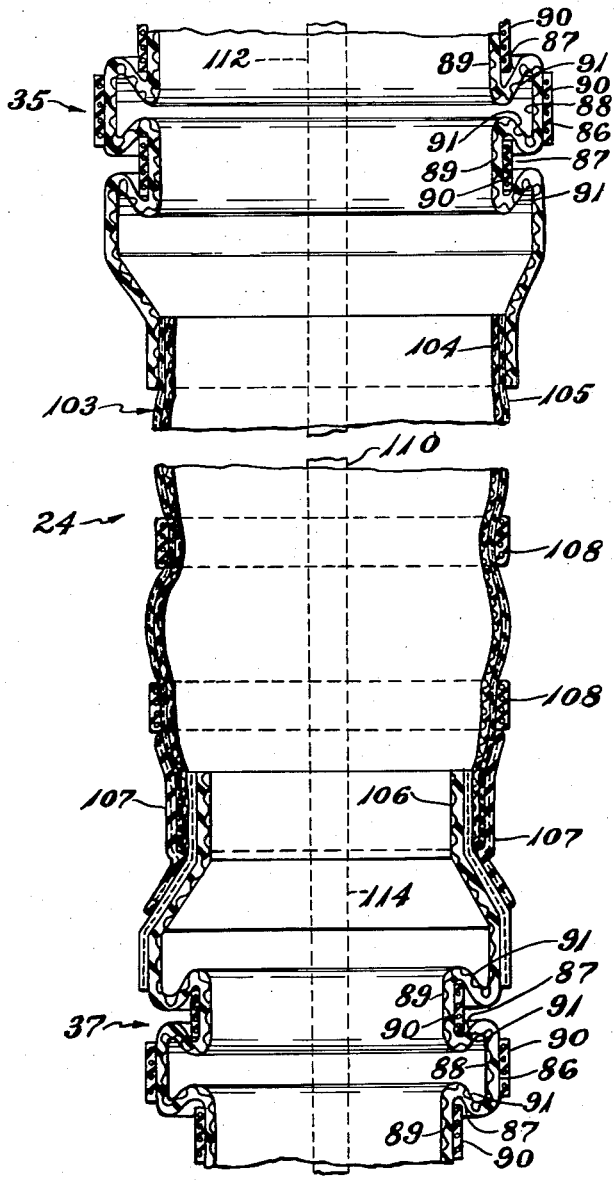
Figure 7:
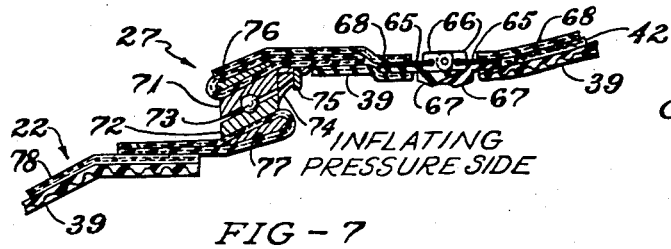
Figure 10:
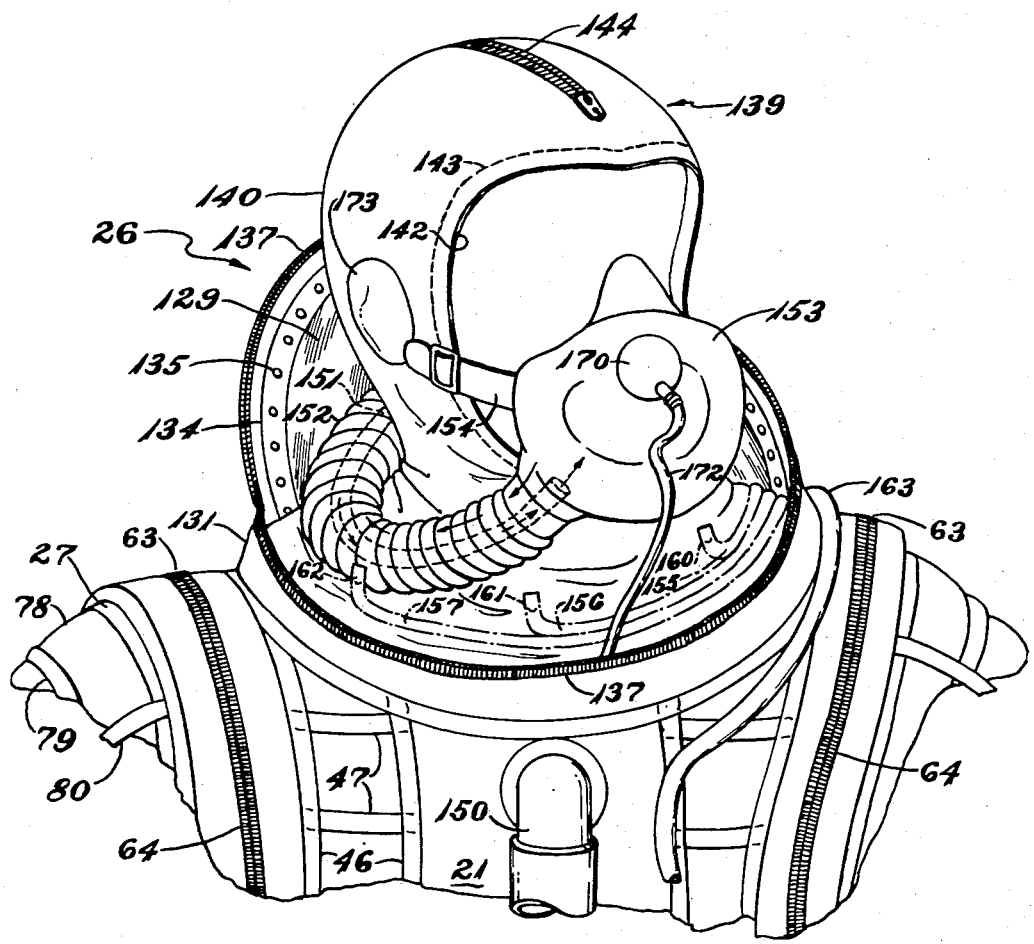

In the accompanying drawings which form a part of this specification and in which like numerals are employed to designate like parts throughout the same, Fig. 1 is a front elevational view of an improved protective inflatable suit under internal inflating pressure and in normal standing position with the torso covering forwardly inclined relative to the leg coverings, and constructed in accordance with and embodying the invention, Fig. 2 is a rear elevational view of the inflated suit shown in Fig. 1, parts being broken away, Fig. 3 is a left side elevational view of the inflated suit temporarily supported by an ordinary chair, Fig. 4 is a three-quarter front view from the right side of the inflated suit showing the torso covering upright with its divided lower front portion in an extended open condition, Fig. 5 is a sectional view in an enlarged scale taken along line 5—5 of Fig. 1 showing the integral dual wall of the torso covering, parts being broken away, Fig. 6 is a sectional view in an enlarged scale taken along line 6—6 of Fig. 1 showing the divided lower front portion of the torso covering in the closed condition, parts being broken away, Fig. 7 is a sectional view taken along line 7—7 of Fig. 1 showing a rotatable shoulder connection between the torso and arm coverings, parts being broken away, Fig. 8 is a longitudinal sectional view taken along line 8—8 of Fig. 1 showing a jointed thigh portion and knee joint of a leg covering, parts being broken away, Fig. 9 is a longitudinal sectional view in an enlarged scale taken along line 9—9 of Fig. 1 showing an adjustable boot connected to the knee joint of the leg covering, parts being broken away, Fig. 10 is a front elevational view of the upper part of the inflated suit of Fig. 1 but showing the outer head covering or helmet laid back to expose an inner head covering, face mask and anti-fogging arrangement of the suit, parts being broken away, Fig. 11 is a sectional view in an enlarged scale taken along line 11—11 of Fig. 1, parts being broken away, and Fig. 12 is a sectional view taken along line 12—12 of Fig. 1 showing adjustment means for the gauntlet.

General organization of suit

The protective inflatable suit 20 is of the omni-environment, full-pressurized type and has an improved, flexible, impervious, unitary, i.e. integrally united, double thickness wall construction tailored or proportioned to fit the wearer. The suit provides in effect a protective envelope about the whole wearer, and its construction and arrangement comprises a torso covering or portion 21, arm coverings or portions 22, 23, leg coverings or portions 24, 25, and a head covering assembly 26 and includes connector means for electrical communication purposes and improved means for conducting oxygen and inflating air. Also, the suit includes full-circle rotatable bearing connectors 27, 28, 29, 30 with seals at the suit's shoulder and elbow regions, respectively, and includes flexible multi-fluted joints 31, 32, 33, 34, 35, 36, 37 and 38 at the elbow, upper arm, upper thigh and knee regions of the suit, all of which make feasible complete and extensive freedom of movement by the wearer notwithstanding the stiffening of tubular wall portions of the suit by the action thereon of an internal pressure exceeding the outer pressure in a pressurized or a non-pressurized aircraft compartment or cockpit, or in high altitude outer space.

The tailored fit and compactness of construction of the suit together with its built-in resistance to objectionable localized bulging under inflation is advantageous for use in cockpits of limited size, and has the further advantage of providing a narrow space between the wearer's body and the walls of the suit so that inflating air normally can flow in such space about the limbs and torso of the wearer as for cooling and ventilating purposes. This is important for maintaining the wearer at a comfortable temperature for long periods. The suit is always inflated while in use in an airplane and has provision for carrying its own atmosphere—oxygen, pressure and air conditioning—whereby it maintains an artificial environment all about the wearer corresponding to that existing at some desirable safe low altitude such, for example, as about 8 to 12 thousand feet above sea level, which artificial environment can be maintained substantially constant for any higher altitude and is separate from the environment inside or outside an aircraft in flight.

The protective inflatable suit 20 provides in effect an inner garment or lining of highly flexible, thin, gas-impervious sheet material for retaining the inflating air, and an outer restraining garment or covering of flexible, stress-resistant, impervious sheet material integrally united throughout with the inner lining for withstanding the inflating stresses on and resisting undue bulging of the inner garment or lining.

Torso covering

A suitable metal building form (not shown) having an armless torso part in angular or inclined relation to a pair of leg ports so that all the parts are arranged to approximate the normal inclined relationship of the wearer's torso and legs in the seated position of the wearer, is used for assembling thereon the torso covering 21 and at least upper portions of the leg coverings 24, 25 to facilitate convenience of manufacture and uniformity of tailored fit. The suit, after it is vulcanized on and stripped from the building form and is in the generally upright inflated condition shown in Fig. 1, has the torso covering 21 forwardly inclined relative to the leg coverings 24, 25, so that the inflated suit 20 will normally tend to assume and maintain the seated position shown in Fig. 3, without requiring the exertion of objectionable effort by the wearer. This is advantageous for wearing the suit continuously during a long period of time without producing undue fatigue of the wearer.

The torso covering 21 has an inner wall lining 39, as shown in Fig. 5, of extensively flexible, impervious, single thickness, lightweight sheet material such, for example, as a stockinette or a knitted fabric 40 of cotton, nylon, rayon, silk or other suitable strong filamentary material, coated, impregnated or otherwise treated on one face only of the fabric to provide thereon a relatively thin, continuous film or layer 41 of an elastic rubber-like composition of rubber, natural or synthetic, or other rubber-like material having substantially similar chemical composition or physical properties to natural rubber and to equivalents therefor, all of which are generally known as elastomeric materials. Preferably, the inner wall lining 39 is made of a cotton stockinette fabric 40 which is a single thickness, highly flexible, lightweight, ribbed, knit fabric with little or no stretch in the direction along the ribs but stretchable crosswise of the ribs. The face of the stockinette fabric which is in its natural fibrous state, i.e. has no layer of rubber-like composition thereon, is disposed at the inside of the suit so as to be nearest the wearer's body, whereby the inner wall lining 39 will normally feel warm and soft to the wearer's skin. The thin impervious layer 41 on the other or outer face of the stockinette fabric 40 is preferably formed of a resilient, natural rubber composition. The inner wall lining 39 constitutes the primary air-retaining member of the wall of the torso covering 21.

The stockinette fabric 40 in the torso covering has the ribs extending longitudinally or lengthwise of the tubular torso covering to resist objectionable longitudinal stretching and lengthening of the suit at this region thereof, but permitting limited lateral or circumferential stretching and distension or bulging of the inner wall lining 39 under inflation of the suit.

The torso covering 21 has a flexible, stress-resistant, bulge-restraining outer wall covering 42 contacting, backing and adhesively bonded, as by liquid rubber cement and vulcanization, directly to the inner wall lining 39 continuously throughout the torso covering, except as described hereinafter, to resist blow-out of and relieve the inflating stress in the inner wall lining and to prevent objectionable stretching and outward distension of the inner wall lining upon inflation of the suit. Preferably, the outer wall covering 42 is made of a flexible, single thickness, square-woven and closely woven, textile fabric sheet material 43 of cotton, nylon, rayon, silk or other filamentary material and desirably of cotton, which textile fabric sheet material is coated, impregnated or otherwise treated on both faces thereof to provide thin, impervious films or layers 44, 45 of a suitable elastic rubber-like composition, desirably a resilient, natural rubber composition. The rubber treated square-woven cotton fabric 43, is arranged straight-laid on the tubular torso covering 21 so that threads of the square-woven fabric extend longitudinally or lengthwise of the torso covering to resist longitudinal inflating stress in the inner wall lining 39 and to resist objectionable stretching and lengthening of the suit at this region, while the other threads of the square-woven fabric extend laterally or circumferentially of the torso covering 21 to resist circumferential inflating stress in the inner wall lining 39 and to restrain circumferential distension or bulging of the inner wall lining under inflation of the suit.

Torso restraining band members

The torso covering 21 being tubular and of rubber and fabric, integral dual wall construction tends to become objectionably stiff and highly resistant to flexure under internal inflating pressure, thereby hindering freedom of movement and bending and flexure of the torso covering relative to the adjacent parts of the suit and of the torso covering itself. Also, the torso covering tends to lengthen somewhat under inflating stresses, by virtue of the slight give and limited stretching of the textile fabric materials forming both the inner lining 39 and the outer covering 42, and this is objectionable because it permits undue lifting or upward displacement of the head covering assembly 26 relative to the wearer's head, especially for the seated position of the suit, which lifting impairs the vision of the wearer.

The invention provides means including two groups of spaced-apart, flexible restraining means or band members in desirably a generally rectangular grid arrangement, as shown in Figs. 1 to 5, inclusive, for overcoming these difficulties. One group of band members 46, 46 extends longitudinally of the torso covering 21 along generally straight paths in circumferentially spaced-apart, generally parallel relation, and the other group of band members 47, 47 extends circumferentially of the torso covering 21 along generally straight paths in longitudinally spaced-apart, generally parallel relation. The circumferential band members 47, 47 may be disposed beneath and united with the longitudinal band members 46, 46 at the positions of juncture or cross-over of the band members, as shown in Figs. 1 to 5, inclusive.

Each generally rectangular area of the wall of the torso covering 21 bounded by adjacent pairs of spaced-apart longitudinal and circumferential band members, for example the respective areas indicated by the numerals 48, 48 in Fig. 2, is desirably relatively small as compared to the wall area of the torso covering as a whole, and may be, for example, about 3 inches longitudinally by about 4 inches circumferentially. This provides localized, small rectangular areas in the torso wall individually subject to inflating distension and thus minimizes the total inflating stress on the wall material in each area, which advantageously facilitates the use of relatively thinner, lighter and more flexible yet sufficiently strong textile fabrics constituting the primary stress-resisting elements in the integral dual wall of the torso covering.

The restraining band members 46, 47 are each substantially inextensible and stretch-resisting. The members 46, 47 may each be made of a narrow strip 49, 50 of weftless or substantially weftless cord fabric of nylon or rayon cords superimposed upon the outer rubber layer 45 of the outer wall covering 42 and adhesively secured thereto as by a suitable liquid rubber cement, with a suitable thin, flexible, extruded rubber cover strip 51, 52 superimposed upon and adhered to the weftless cord fabric strip and to the outer rubber layer 45. It will be noted that the rectangular grid of restraining band members interrupts the continuity of the inflating stresses in the torso wall, longitudinally and circumferentially, so as to facilitate increased flexure and bending of the torso covering 21 as a whole, and coacts with the outer wall covering 42 to restrain and limit the distension or outward bulging of the inner wall lining 39, although permitting limited bulging or distension of the torso wall at each of the adjacent localized and relatively small areas 48, 48 without objectionable stiffening of the torso covering 21.

*Torso length-adjusting means*

The torso covering 21 has provision of means integral therewith for adjustment of its length to accommodate several sizes of torsos and to coact with the longitudinal restraining band members 46, 46 to resist objectionable lifting of the head covering assembly 26 relative to the wearer's shoulders. To these ends, the outer wall covering 42 is divided along a continuous, circumferentially extending, straight path at a position above yet adjacent and spaced from the upper hip regions of the suit i.e. the junctures of the torso covering 21 and the respective leg coverings 24, 25 at the two sides of the suit, as shown in Figs. 1 to 4, inclusive, and 6. The outer wall covering 42 has its circumferentially-extending margins 53, 54 at the divide initially spaced-apart a sufficient distance longitudinally of the torso covering 21 to provide for a suitable range of adjustment of the overall length of the torso covering, as shown especially in Fig. 6, and to facilitate increased flexure of the lower part of the torso covering.

However, in order to maintain air-tightness of the torso covering and also accommodate such lengthwise adjustment of the outer wall covering 42, the inner wall lining 39 is not only continuous, but has an extensible portion of sufficient width to provide a succession of interconnected, axially flat, annular folds 55, 55 extending entirely and continuously about the torso covering 21 and extending from the upper margin 53 to a position downwardly beyond the free edge of the lower margin 54 of the outer wall covering 42 in separated or unattached relation thereto, as shown in Figs. 4 and 6. The remainder of the lower front part of the inner wall lining 39 is not folded and continues downwardly unbroken in unattached relation to the front portion 58 of the outer wall covering 42 from the extensible portion 55 to the junction of the torso covering and the leg coverings. The corresponding remainder of the lower back part of the inner wall lining 39 is not folded but is attached throughout to the overlying outer wall covering. This makes feasible the extension and the shortening of the torso covering 21 within a range of several inches such, for example, as zero inches to about 3 inches or if desired, even to about 6 inches without danger of loss of the inflating air, and facilitates increased bending of the lower part of the torso covering.

The upper margin 53 and the lower margin 54 of the outer wall covering are each folded and provided with metal grommets 56, 56 circumferentially spaced-apart in series entirely about the torso covering. A suitable strong cord 57 is laced back and forth through the grommets 56, 56 in the margins 53, 54 and the ends tide, as shown in Fig. 1, to facilitate maintaining a desired spacing between the margins 53, 54. This arrangement makes feasible a lengthwise adjustment of the torso covering 21 by the wearer, especially after assuming a seated position.

The lower front portion 58 of the outer wall covering 42 below the divide is detachably joined to the inner wall lining 39 and to the leg coverings 24, 25 by means of a slide fastener 59, desirably of the non-sealing type. The slide fastener extends from the hip region at one side of the suit along the front juncture of the torso covering and one leg covering to the crotch of the suit and then along the front juncture of the torso covering and the other leg covering to the hip region at the other side of the suit. One fabric stringer 60 of the fastener is suitably adhered to the outer wall covering 42, while the other fabric stringer 61 is suitably adhered to the wall of the leg coverings, as shown in Fig. 6. The slide fastener is normally kept closed as shown in Fig. 1.

When the slide fastener 59 is in the open condition shown in Fig. 4, the folded extensible portion 55 or bellows-like part of the inner wall lining 39 can be extended longitudinally and the lower front portion 58 of the outer wall covering 42 can be moved upwardly relative to the leg coverings 24, 25. Thus, the torso covering 21 can assume a position in alignment with the leg coverings, instead of being forwardly inclined thereto, so that it is possible for the wearer to assume an erect posture without imposing undue pulling strain on the leg coverings and, if desired, while the suit is inflated.

The lower front portion of the inner wall lining 39 is provided with a vertical fly opening closed by a suitable slide fastener 62 of the pressure-sealing type such as that shown in Figs. 7 and 11 and described and claimed in the Krupp Patent 2,545,817. This is desirable for the urination relief of the wearer without removing the suit.

*Torso entrance opening and closure therefor*

The integral dual wall 39, 42 of the torso covering 21 has an elongated, continuous entrance opening or slit, indicated by the numeral 63, to facilitate donning and doffing the suit. The slit 63 begins and ends at the respective front sides of the torso covering at the region of the hips and above the extensible portion 55 of the inner wall lining 39 and the divide in the outer wall covering 42. The slit extends upwardly along the right front of the torso covering and across the right shoulder, and continues around the back of the suit at the neck region thereof and across the left shoulder, and then extends downwardly along the left front of the torso covering to a position adjacent the left hip and above the extensible portion 55 and the divide in the outer wall covering 42, as shown in Figs. 1, 2, 3 and 4. The margins of the torso covering at the entrance slit 63 are separably joined preferably by a suitable sealing slide fastener or closure 64 such, for example, as the type described and claimed in the Krupp Patent 2,545,817. As shown especially in Fig. 7, the closure has impervious rubber-coated fabric stringers 65, 65 mounting the teeth 66, 66 and adhesively attached by a suitable rubber cement to the adjacent margins of the inner wall lining 39 such that the resilient rubber, L-shaped sealing elements 67, 67 are positioned at the inside of the suit for effecting lip-action sealing to prevent air leakage between the teeth. For increased air-tightness and strength, rubber coated square-woven cotton fabric tapes 68, 68 may be superimposed upon and adhesively attached to the stringers 65, 65 and to the outer wall covering 42. The arrangement makes feasible opening the front of the torso covering 21 as well as placing and removing the head covering assembly 26 from the wearer's head, and permits donning the suit feet first through the entrance slit.

*Arm covering attachment*

The arm coverings 22, 23 are rotatably attached to the torso covering 21 at the margins thereof about the arm openings therein by means of special ball bearing connectors 27, 29 for effecting full-circle (360°), relative rotative movement of adjacent parts of the arm coverings and the torso covering. The right shoulder bearing connector 27 shown in section in Fig. 7, is constructed like the left shoulder bearing connector 29 except for a right hand arrangement of parts, and includes a pair of radially spaced, concentric, annular race members 71, 72 acutely inclined in the same direction relative to the axis of rotation of the bearing, and accommodating therebetween a single row of small diameter balls 73. The bearing 27 also includes a special nylon sealing ring 74 held in place on the outer race member 71 by a suitable retaining ring element 75. Locking rings 76, 77 are used to secure the torso covering 21 and the arm covering 22 in an air-tight manner to the inclined race members 71, 72 of the bearing connector 27. The bearing connectors 27, 29 are normally subject to nominal radial loads and to relatively great thrust loads resulting from the axial separating forces produced by the inflating pressure on adjacent tubular parts of the suit at the shoulder, and are especially suited to withstand such loads, while providing for great freedom of relative rotative movement of such adjacent parts of the suit.

The ball bearing shoulder connectors 27, 29 are like those more fully described and claimed in my said copending application, Serial No. 387,168, filed October 20, 1953, referred to hereinabove and to which application reference is made for further information about the specific details of construction of the connectors.

Arm coverings

Each arm covering 22, 23 is of similar construction except for the right and left hand arrangement of parts thereof, and is generally like the construction of the corresponding arm covering for the inflatable suit described and claimed in my said copending application Serial No. 387,168, but differs in several aspects as described hereinafter. For illustrative purposes, only the right arm covering 22 will be described in detail. This arm covering 22 has a relatively short, tubular upper portion 78 connected to the locking ring 77 on the inner race member 72 of the ball bearing connector 27 as shown in Fig. 7, which upper portion 78 is formed such that, under inflation, it will have normally a 45° sideward and downward inclination relative to the torso covering 21 for facilitating vertical swinging of the arm covering.

The upper portion 78 is of integral, dual-walled construction like that described for the torso covering 21 and has an inner wall lining of suitable stockinette fabric coated on one side only with resilient rubber composition, and an outer wall covering of suitable square-woven fabric coated on both sides with resilient rubber composition and bonded throughout to the inner wall lining. Substantially midway of its length, the upper portion 78 has bonded continuously to its outer wall covering a suitable circumferentially continuous, restraining band member 79 which is made like a band member 47, for example, in the torso covering 21. The upper portion 78 is also provided with a pair of diametrically opposite, generally flat, stretch-resisting, flexible hinge strips 80, 80 of suitable weftless cord fabric and rubber construction (like band member 47, for example) extending axially or longitudinally from end to end of the upper portion 78. These hinge strips 80, 80 promote hinging flexure of the said upper portion, and maintain the desired axial length of the upper portion, and resist objectionable outward bulging along the opposed sides of the upper portion 78.

The tubular upper portion 78 is fixedly and permanently attached adhesively and sealingly at its lower margin to a flexible multi-fluted joint 33 of relatively greater length. The joint 33 is also normally inclined 45° relative to the torso covering for the axially straight, inflated condition of the joint, and extends along the remainder of the upper part of the wearer's arm to a position adjacent and above the wearer's elbow. The flexible joint 33 is permanently and rotatively attached to a second flexible multi-fluted joint 31 of reduced length and outside diameter accommodating the elbow of the wearer and extending partially along the upper region of the lower part or forearm of the wearer. A suitable ball bearing connector 28 including suitable locking rings therefor interconnects the flexible upper joint 33 and the flexible elbow joint 31 for full-circle, relative rotating movement thereof, and is constructed and arranged, except for diametrical size, substantially like the ball bearing connector 27 shown in Fig. 7. The specific constructional details of the connector 28 and of the attachment of the flexible joints 31, 33 to the connector 28 locking rings are shown in Figs. 9, 21, 22, and 23 of the drawings in my said copending application, Serial No. 387,168, filed October 20, 1953, and are more fully described therein. The flexible multi-fluted elbow joint 33 at its lower end margin is fixedly and permanently attached adhesively and sealingly, as shown in Fig. 12, to a tapered gauntlet 84 merging at its lower end in a glove 85.

Flexible upper arm and elbow joints

Each flexible joint 31, 33 of the arm covering 22 is of similar construction, except as to the number of flutes or corrugations and overall length and diameter, and is similar, except as to number of flutes and dimensions, to the flexible multi-fluted joints 35, 37, in the right leg covering 24 which joints 35, 37 are shown especially in Fig. 8. Also, each flexible joint 31, 33 is constructed and arranged, except as to number of corrugations and overall length and diameter, like the flexible joint 45 fully described in detail and claimed in my said copending application, Serial No. 387,168, filed October 20, 1953 to which application reference is made for specific details of construction of the joint. Each flexible joint does not require a dual wall construction such as is used in the torso covering 21, for example, thereby having increased flexibility of the joint as a whole.

Only the flexible multi-fluted joint 31 at the elbow will be briefly described herein, because of the aforesaid similarity of the respective flexible joints. The tubular wall of the joint 31 comprises extensively flexible, impervious, burst-resistant material such, for example, as single-thickness, cotton stockinette fabric having a thin continuous coating, film or layer of suitable resilient rubber composition on one side only, which coating is preferably at the exterior of the joint. The tubular wall of the joint 31 has a series of substantially parallel, peripheral or circumferential flutes or corrugations perpendicular to the longitudinal axis of the joint in its straight condition, as built, and in continuation of one another.

The series of flutes of the joint 31 are like those of the joints 35, 37 which have the ridges 86 and grooves 87 on the exterior substantially corresponding to the grooves 88 and ridges 89 on the inside of the joint (see Fig. 8); hence the same numerals are employed herein to designate the ridges and grooves of the joint 31 (see Fig. 12). In the joint 31 like those in the joints 35, 37, each large diameter outer ridge 86 and each reduced diameter inner ridge 89, preferably circular, has a continuous annular wall substantially straight or flat in axial cross-section reinforced entirely across its relatively narrow axial width by an external annular reinforcing band 90 desirably of single thickness, substantially weftless rayon cord fabric or of square-woven, close mesh nylon fabric friction coated one side only with a suitable resilient rubber composition, the band 90 being adhesively secured to the wall of the ridge.

The flat outer ridges 86 are preferably of substantially uniform axial width relative to one another and the flat inner ridges 89 are preferably of substantially uniform axial width relative to one another and to the flat outer ridges, which symmetry is advantageous for uniformity of bending and balanced tilting movement of the joint. For the axially straight condition of the joint, the adjacent peripheral margins of immediately adjacent outer and inner ridges are normally in radially spaced, and preferably slightly overlapping relation with highly flexible connecting portions of the single thickness, rubber treated stockinette fabric (like the portions 91 of the joints 35, 37) extending in continuation of and between the adjacent margins in a reversely curved, relatively compact disposition in the radial space between the adjacent margins. The arrangement provides for progressive folding and unfolding i.e. rolling movement of each reversely curved connecting portion, while the relatively stiffer ridges maintain their axial flatness, and provides for maximum freedom of bending and swinging movement, and stabilized, extensive flexure throughout a wide range of angularity of relative tilting of end portions of the joint, and also relative tilting movement of the outer and inner ridges.

For effecting hinge-like bending of the joint 31 in a forward and rearward direction, and also control relative axial and tilting movement of the flat ridges 86, 89 and control rolling movement of the connecting portions for stability purposes, diametrically opposite, suitable stretch-resistant, flexible hinge elements 92, 93 extend in straight paths continuously and axially along the opposite side regions of joint in contacting adhered relation to the outer ridges 86 only and are suitably adhesively secured to the end margins of the joint. The flexible hinge elements 92, 93 flex and bend under forward and rearward bending and swinging of the joint and thus facilitate maximum bending with minimum effort by the wearer.

It will be noted that suitable flexible hinge elements 81, 82 of the upper arm flexible joint 33 are bonded to and in continuation of the hinge strips 80, 80 of the tubular upper portion 78, and coact therewith to maintain the desired overall length of the arm covering between the shoulder rotatable connector 27 and the elbow rotatable connector 28, thereby continuously retaining the flexible elbow joint 31 in position about the elbow of the wearer.

The upper arm flexible joint 33 and the flexible elbow joint 31 are suitably secured to the rotatable connector 28 as shown in the drawings and in the manner shown in Fig. 9 of and described in my said copending application, Serial No. 387,168.

Gauntlet

The tapered gauntlet 84 or lower arm portion is fixedly and sealingly secured to the lower end of the flexible elbow joint 31, as shown in Fig. 12, and is similar in construction to the gauntlet described and claimed in my said copending application, except as described more fully hereinafter. The gauntlet 84 has a tubular inner wall lining 94 of suitable stockinette fabric coated on the outside only with a thin, impervious layer of suitable resilient rubber composition, the lining being integrally and sealingly united at the upper end of the gauntlet with the joint 31 and at the lower end of the gauntlet with the glove 85. Surrounding the major part of the inner wall lining 94 but terminating short of the juncture between flexible elbow joint 31 and the lining 94, is an outer wall covering 95 of suitable open-mesh nylon fabric, as shown in Figs. 1 and 12, which arrangement advantageously facilitates restraining objectionable bulging of the inner wall lining 94 and facilitates the provision of means for adjusting the length of the gauntlet hence the overall length of the arm covering 22.

For adjustment purposes, an annular reinforcing band 96 of suitable square-woven textile fabric coated with suitable resilient rubber composition is adhesively attached overlappingly to the lower margin of the flexible elbow joint 31 and to the upper margin of the inner wall lining 94. The reinforcing band 96 has a free marginal portion which is provided with a series of circumferentially spaced-apart grommets 97. The upper margin of the outer wall covering 95 is desirably suitably reinforced and has a series of circumferentially spaced-apart grommets 98. A suitable strong cord 99 is laced back and forth through both sets of grommets 97, 98, and tied, as shown in Figs. 1 and 12. This makes feasible an adjustment of about (1") one inch in length of the gauntlet 84.

The outer wall covering 95 is marginally attached adhesively to the glove and is longitudinally divided along the back of the gauntlet to a position beyond the wrist region to facilitate passage of the wearer's hand. The margins of the covering 95 at its divide are separably joined desirably by a suitable non-sealing slide fastener 100. The outer wall covering 95 is also provided with longitudinally spaced-apart, circumferentially-extending restraining band members 101 of suitable weftless cord fabric and extruded rubber strip construction, to resist bulging of the inner wall lining 94 and facilitate flexure of the gauntlet.

Glove

The glove 85 is like the glove described and claimed in my said copending application, Serial No. 387,168, and has a suitable impervious, rubber coated, stockinette fabric wall throughout all its portions. The thumb and finger portions are constructed and arranged with suitable corrugations and length-maintaining means for making feasible extensive flexibility of bending of the thumb and finger portions. A suitable detachable guard 102 of aluminum grid construction is mounted upon the palm portion of the glove for facilitating bending and flexure of the palm portion.

The arm covering described hereinabove entirely encloses, hence fully protects the wearer's arm including the hand, and has provision of adjustment of length and resistance to objectionable elongation to accommodate the particular arm length of the wearer, and also has provision of utmost freedom of flexing, bending and swinging movement together with full-circle relative rotative movement of adjacent parts of the arm covering. The normal 45 degree angular disposition of the upper arm portion 78 and of the upper arm flexible joint 33 advantageously avoids undue lateral bulkiness at the shoulder region, and facilitates a very wide range of sidewise swinging of the arm covering 22 and a disposition of the arm covering 22 along and closely adjacent the side of the torso covering 21. This lateral compactness of the suit is highly desirable for use of the suit in the confined space of the relatively narrow cockpit of a fighter airplane, for example.

Leg covering

The leg coverings 24, 25 are sealingly and integrally secured adhesively to the torso covering 21 at the region of the hips and along margins corresponding to the lines of natural flexure or movement of the wearer's legs relative to his torso. The leg coverings extend normally in forwardly and downwardly inclined relation to the torso covering which angular relationship is approximately equal to that assumed by the legs relative to the torso of the wearer in the seated position of the wearer's body, as shown especially in Figs. 1, 2 and 3. This avoids objectionable upward movement of the torso covering 21, hence the head covering assembly 26, relative to the wearer's torso in the inflated, seated position of the suit and reduces or eliminates objectionable looseness and frontal bulging of the torso covering at its lower frontal region.

Each leg covering 24, 25 is of similar construction except for the right and left hand arrangement of parts, hence only the right leg covering 24 will be described in detail.

Thigh portion with flexible joint

The leg covering 24 has a tubular thigh portion 103 of suitable integral dual-walled construction substantially like that of the torso covering 21 and comprising an inner wall lining 104 of suitable rubberized, cotton stockinette fabric and a bulge-restraining outer wall covering 105 of suitable rubberized, square-woven cotton fabric bonded adhesively throughout to the lining 104, as shown especially in Fig. 8. The thigh portion 103 extends from its juncture with the torso covering 21 to a suitable flexible knee joint 37 to which it is sealing and fixedly attached adhesively in overlapping relation to the upper marginal end 106 of the joint 37, the attachment being reinforced as by a suitable rubberized, square-woven fabric band 107.

The thigh portion 103 has a suitable flexible multi-fluted joint 35 intermediate its length and adjacent the crotch of the suit to facilitate flexure of the leg covering 24 at its upper region directly adjacent the crotch and lower hip areas of the wearer and also to facilitate increased flexibility and bending of the suit at its lower torso and hip regions. The flexible upper thigh joint 35 is relatively short as compared to the flexible knee joint 37 for effecting localized flexure of the thigh portion 103. The flexible upper thigh joint 35 and the flexible knee joint 37 are each constructed and arranged like the flexible joints 33, 31 in the arm covering, except as to overall length and diameter and number of flutes or corrugations, and also like the flexible joint (45) described and claimed in my said copending application, Serial No. 387,168, filed October 20, 1953, to which application reference is made for specific details of construction of the joint.

A plurality of longitudinally spaced-apart, circumferentially-extending restraining members 108, 108 of suitable substantially weftless cord fabric and extruded rubber strip construction are adhesively attached to the outer wall covering 105 of the thigh portion above the flexible upper joint 35 and also desirably below the joint 35, as shown in Figs. 1 to 4, inclusive, and 8. Flexible hinge elements 109, 110 of suitable substantially weftless cord fabric and extruded rubber strip construction extend longitudinally along the thigh portion 103 at the inner side region and the outer side region thereof in adhesively attached relation to the outer wall covering 105 and to the underlying restraining members 108. The hinge elements 109, 110 are adhesively secured to and extend in continuation of suitable flexible hinge elements 111, 112 and 113, 114 of the respective flexible joints 35 and 37, so as to restrain objectionable lengthening of the leg covering under inflation of the suit and also facilitate forward and rearward bending of the leg covering.

*Adjustable boot*

The flexible knee joint 37 at its lower end margin is fixedly and sealingly attached adhesively in overlapping relation to the upper inner part of a boot 115. The boot entirely encloses the wearer's leg below the knee and also the wearer's foot, as shown especially in Fig. 9. The boot 115 has a continuous, tubular, inner wall lining 116 of suitable rubberized, cotton stockinette fabric extending from its attachment to the flexible knee joint 37 continuously to the region of the wearer's ankle and continuing beyond the ankle in the form of a closed shoe-shaped lining 117 for enclosing the wearer's foot. A suitable arch support insert 118 is adhesively secured to the shoe-shaped lining 117 at the inner face and sole area thereof. A flexible, laterally jointed, wooden inner sole 119 is adhesively secured to the lining 117 at the outside face and sole area thereof, and a suitable rubber sole and heel 120 is adhered to the bottom of the inner sole 119, as shown in Fig. 9.

The boot 115 includes a tubular outer wall covering 121 of closely woven, square-woven nylon fabric without a rubber coating thereon, which covering 121 encloses and backingly supports the major part of the tubular inner wall lining 116 and extends conformingly about the upper wall of the shoe-shaped lining 117 to which upper wall it is adhesively secured. However, the outer wall covering 121 is continuously and adhesively secured to the inner wall lining 116 (above the shoe-shaped lining 117) only at the back of the boot along a vertically-extending narrow zone.

The outer wall covering 121 is divided longitudinally along the front of the boot 115, and has a suitable non-sealing slide fastener 122 adhesively secured to its margins at the divide to detachably join the margins, and to maintain a good fit of the outer wall covering about the inner wall lining and restrain objectionable bulging of the lining. This arrangement facilitates widely opening the outer wall covering for ease of inserting and withdrawing the wearer's foot through the space in the tubular inner wall lining.

The outer wall covering 121 terminates short of the attachment of the inner wall lining 116 to the flexible knee joint 37, so that the upper marginal portion 123 of the covering 121 is substantially spaced from the said attachment. A suitable rubberized, woven fabric band 124 overlapping and adhered to the inner wall lining 116 and margin of the joint 37 and having a series of circumferentially spaced-apart grommets 125, as shown in Fig. 9, is provided to reinforce the attachment of the lining 116 to the joint 37 and also for adjustment purposes. The upper marginal portion 123 of the outer wall covering has a series of circumferentially spaced-apart grommets 126, and a suitable strong cord 127 is laced back and forth through the two sets of grommets 125, 126 and tied. The arrangement facilitates an adjustment of about (2") two inches, for example, in the length of the boot, hence the overall length of the leg covering 24, so as to accommodate different lengths of legs.

*Head covering assembly*

The head covering assembly 26 for protecting the wearer's head while permitting vision, includes an outer head covering 128 having a generally spherical upper part 130 merging smoothly with a reduced diameter lower part or annular collar 131 fixedly and sealingly secured to the margin of the torso covering 21 at the neck opening therein, as shown especially in Figs. 1, 2, 3, 10 and 11. A face piece or visor 129 of suitable thin, transparent, rigid plastic, sheet-like material is provided at the frontal area of the spherical upper part 130 of the head covering 128 for facilitating good vision. The collar 131 and the remainder of the spehical upper part 130 are of suitable impervious, integral, dual-walled, stockinette and square-woven fabric and rubber construction with suitably reinforced seams and lateral restraining elements 132 of suitable rubberized weftless cord fabric strips.

The visor 129 may be mounted between a pair of narrow reinforcing bands 133, 134 of thin aluminum extending continuously about the peripheral margin of the visor and adhesively attached to the fabric wall of the head covering 128, as shown in Fig. 11. The visor and reinforcing bands are secured sealingly together as by suitable countersunk head screws 135, or as by rivets, if desired.

The assembly 26 has provision for lifting the outer head covering 128 including the visor 129 from in front of and over the wearer's head while the suit is being worn. To these ends the integral, dual fabric wall of the head covering 128 is divided along a path extending from a position in the spherical upper part 130 at an upper rear side thereof slantingly downward to and then around the front region of the collar 131 and next slantingly upward to a corresponding position in the spherical upper part 130 at the opposite rear side thereof to provide a hinging zone at 136 of fabric material between said positions. A suitable sealing slide fastener 137 is adhesively attached to the margins of the spherical upper part 130 and of the collar 131 along the divide for separably sealing and joining said margins, as shown in Figs. 1, 2, 3, 4 and 11. The fastener is provided with a suitable slider and pull strap 138 for convenience of operation by the wearer.

When the suit is inflated or uninflated and the fastener is opened, the outer head covering 128 can be swung from in front of the wearer's face and over the head to the back of the same, as shown in Fig. 10, by virtue of a hinging movement at the hinging zone 136. Also, the outer head covering 128 can be quickly and easily swung from its rear position back over the head by the wearer, and can be quickly sealed and closed by simply closing the slide fastener 137.

*Inner hood and diaphragm*

Heretofore, inflatable flying suits have generally been equipped with a suitable thin, resilient rubber diaphragm across the neck opening in the torso covering to separate the space within the head covering or helmet from the space within the torso covering, so as to avoid, as much as possible, dangerous fogging of the face piece or visor by the condensation of moisture on the inner surface of the visor, which moisture is due largely to the evaporation of perspiration from the wearer's head and neck. The invention provides improved means for reducing the fogging to a minimum, thereby maintaining clarity of vision through the visor 129, and for maintaining the neck and major part of the head area under the inflating pressure within the torso covering 21; hence increasing the safety of the wearer. To these ends, the head covering assembly 26 includes an integral, one-piece, inner head covering 139 or combined hood and diaphragm which separates the space within the torso covering 21 from that within the outer head covering 128.

The inner head covering 139 or combined hood and diaphragm is made of thin, stretchable, impervious, flexible sheet-like material such, for example, as single thickness, cotton stockinette fabric with a thin continuous layer, on one face only, of suitable resilient rubber composition. The inner head covering 139 has the uncoated face of the stockinette fabric at the inside so as to be nearest and contact directly the head and neck of the wearer.

The upper part of the inner head covering constitutes a stretchable hood portion 140 formed to fit snugly the wearer's head as shown in Fig. 10, and merges with the lower part constituting an annular, continuous diaphragm portion 141 around the neck sealingly and adhesively secured peripherally to those parts of the collar 131 and the torso covering 21 adacent and below the slide fastener 137, as shown especially in Fig. 11.

The hood portion 140 is cut out at the front thereby providing a peripheral margin 142 defining a face opening, which margin extends continuously across the forehead and along both sides of the face and under the chin of the wearer. The margin 142 is provided at the uncoated face of the stockinette fabric, with a continuous narrow, thin sealing strip 143 of resilient rubber composition for conforming to and sealing against the adjacent skin of the wearer.

The hood portion 140 is desirably divided centrally and longitudinally with the divide extending from the upper reg.on of the margin 142 to substantially the beginning or reduced diameter region of the diaphragm portion 141 normally arranged at the base of the head. A suitable sealing slide fastener 144 with its overlapping sealing elements at the inside of the hood portion is adhesively secured to the margins of the hood portion along the divide and separably joins the latter margins to close the longitudinal divide. This makes feasible opening the hood portion 140 for convenience of inserting the head through the relatively smaller neck opening defined by the stretchable diaphragm portion 141, and then into the hood portion 140 with the slide fastener 144 open. The diaphragm portion 141, by virtue of its flexibility and stretchability at its neck opening region, normally fits snugly and conformingly against and about the wearer's neck. The hood portion 140 can be conveniently restored to its closed condition simply by operation of the slide fastener 144, so as to draw together the two halves of the hood about and against the head and bring the sealing margin 142 against the wearer's face including beneath the chin.

*Inflation means*

For maintaining the inflatable suit under a suitable internal inflating pressure such, for example, as normally about one-tenth pound (0.1 lb.) above that within the pressurized cockpit of the airplane to facilitate maximum freedom of movement during normal use of the suit, there is provided a suitable hollow intake fitting 145 sealingly secured to the torso covering 21 at one side thereof below the shoulder bearing connector 29, the fitting being in communication with the interior of the suit for admitting inflating air under pressure conducted by a flexible conduit 147 such as a suitable rubber hose attached to the fitting 145. A suitable hollow exhaust fitting 146 is sealingly secured to the torso covering 21 at the other side thereof below the shoulder bearing connector 27, which latter fitting is in communication with the interior of the suit for exhausting the inflating air (also exhausted breath) through a suitable flexible conduit 148 attached to the fitting 146.

The intake conduit 147 and the exhaust conduit 148 are connected to a suitable pressure regulator valve (not shown) in the manner described and shown in my said copending application, Serial No. 387,168, which regulator valve is of known construction, and is mounted desirably on the pilots seat, for example, in the cockpit, and is connected to a suitable source of air under pressure (not shown) such as the pressurizing system of the aircraft. The regulator valve maintains the desired normal 0.1 lb. differential inflating pressure in the suit when the suit is in the pressurized cockpit, and also maintains a much greater total pressure in the suit relative to that of the outer atmosphere, initially the pressure in the cockpit plus 0.1 lb. pressure, during emergency use of the suit exteriorly of the aircraft at high altitudes. The regulator valve is arranged to close and seal automatically in an emergency such as failure of the pressurizing system of the aircraft or ejection of the wearer and pilot's seat from within the cockpit. The regulator valve also closes automatically upon sudden loss of pressure within the cockpit as from bullet holes, so that the wearer is fully protected by the suit and can safely continue on his mission at high altitude or return to his base.

*Oxygen supply means*

Oxygen from a suitable source normally carried by the airplane must be supplied to the wearer for breathing during flight at high altitudes and for this purpose an oxygen demand regulator valve 149 of known construction is mounted on the outside of the torso covering 21 at its front chest region. The regulator valve 149 has an upwardly extending external conduit 150 formed of coaxially disposed metal tubes sealingly secured to the torso covering adjacent the collar 131.

Inside the suit, a pair of suitable flexible rubber tubes 151, 152 in coaxial relation are connected to the conduit 150 in communication with the coaxial tubes thereof, and extend therefrom below and around the diaphragm portion 141 to a position at the rear of the hood portion 140 and then up through the diaphragm portion and around the same to the front where they are connected to a suitable oxygen-breathing mask 153 for the wearer's face, as shown especially in Figs. 1 and 10. The inner tube 151 carries the incoming supply of oxygen to the mask 153, while the exhausted breath from the mask passes through the space between the tube 151 and the tube 152 to a suitable position below the diaphragm portion 141 where it is discharged into the space in the torso covering and subsequently exhausted out of the suit through the exhaust fitting 146 and rubber exhaust hose 148. The mask 153 may be detachably held against the face of the wearer by a pair of straps and buckles 154 secured to the respective sides of the hood portion 140 in front of the ear areas thereof.

The exhausting of the breath to interior of the torso covering 21 below the diaphragm portion 141 effectively eliminates a source of moisture tending to fog the visor 129. Also, the inner head covering 139 with its reduced face opening in the hood portion 140, together with the face mask 153 greatly reduce the area of exposed skin of the wearer's head subject to perspiration, and this further reduces the amount of moisture available to vaporize and cause fogging of the visor 129.

*Anti-fogging means*

The invention provides multi-jet anti-fogging means comprising three, small diameter tubes 155, 156, 157 desirably of copper or other relatively stiff material connected to and extending side-by-side from a suitable connector 158 at the upper, left, rear area of the outer head covering 128 downwardly and forwardly along the inside of the latter covering 128 and then along the lower front part of the reinforced peripheral margin of the rigid plastic visor 129, as shown in Figs. 1 and 11. For increased clarity, the tubes are shown in broken lines in Fig. 10, in about the position they normally occupy when the outer head covering is closed as shown in Fig. 1. However, the tubes 155, 156, 157 move with the outer head covering and are suitably fastened to said peripheral margin of the visor as by metal clips 159 and suitable screws (not shown). The tubes are of different lengths and the end portions of the respective tubes 155, 156, 157 are bent upwardly and partially flattened, so as to provide a plurality of upwardly-extending, jet nozzles 160, 161, 162 spaced-apart along the lower front margin of the visor 129.

The tubes 155, 156, 157 are connected through the connector 158 to a suitable flexible conduit or rubber hose 163 extending exteriorly from the outer head covering 128 across the adjacent left shoulder area of the torso covering 21 and down the front of the torso covering to and in communication with a pressure-reducing, bleed-off valve 164 in a supply line or intake conduit 165 of the oxygen demand regulator valve 149, as shown in Figs. 1, 2 and 3. The intake conduit 165 and the bleed-off valve 164 are connected through a suitable flexible supply conduit or rubber hose 166 to a suitable source of oxygen (not shown) preferably including an emergency oxygen bottle mounted on the pilot's seat.

The arrangement facilitates bleeding-off oxygen at a desired reduced pressure from the intake conduit 165 and then passing the oxygen through the rubber hose 163, connector 158, and tubes 155, 156, 157 to the jet nozzles 160, 161, 162. The jet nozzles positively direct the oxygen flow upwardly along and closely adjacent the inner surface of the rigid plastic visor 129 to maintain a suitable positive pressure within the outer head covering and also to prevent effectively condensation of moisture vapor on the visor, especially at eye-level, thereby maintaining clarity of vision through the visor. It will be noted that the multi-jet anti-fogging means, and the inner head covering 139 including the hood portion 140 and diaphragm portion 141, and the coaxial tubing means 150 for exhausting the breath into the torso covering below the diaphragm portion, mutually coact to prevent fogging of the visor 129.

The preferred setting of the oxygen bleed-off valve 164 is such that the space between the outer head covering 128 and the inner head covering 139 is maintained at a positive pressure such, for example, as normally about one-half inch (½") of water, when the inflated suit is worn with the face mask 153 having therein an internal pressure, for example, about one inch (1") of water and worn with the outer head covering closed at high altitudes, and when the torso covering below the diaphragm portion 141 is inflated at a pressure of about 0.1 lb. greater than the pressure existing within the pressurized cockpit. To facilitate this pressure condition in the outer head covering, two, one-way acting, pressure relief or check valves 167, 168 of known construction are mounted on the diaphragm portion 141 desirably at the back region thereof.

One check valve 167 is constructed and arranged to open under substantially greater than normal positive pressure within the outer head covering 128 for communication of the space within the latter covering with the space within the torso covering 21 to reduce the positive pressure within the outer head covering. The other check valve 168 is constructed and arranged to open under substantially less than normal positive pressure within the outer head covering 128 and less than the pressure within the torso covering 21 for communication of the space within the latter covering 21 with the space within the outer head covering to increase the pressure within the head covering to the desired normal positive pressure. The arrangement makes feasible an approximately dead air space within the outer head covering, i.e. minimum circulating flow of moisture-carrying air and what little flow of such air occurs is normally from the outer head covering to the torso covering so that water vapor from perspiration on the torso and limbs of the wearer can't be carried into the outer head covering 128 to cause fogging.

*Communication means*

A suitable electrical lead-in cable 169 having electrical wires therein for connection to a microphone 170 and a pair of earphones (not shown) extends exteriorly of the suit to and through a suitable sealed lead-in fitting 171 mounted on the outer head covering 128 at the back of the wearer's head, as shown especially in Fig. 2. A microphone wire 172 extends inside of the outer head covering from the lead-in fitting 171 to the microphone 170 and is connected thereto, earphone wires (not shown) correspondingly extend and are connected to the earphones which may be positioned on the exterior of the inner head covering 139 at the ear areas thereof.

For increased sensitivity of hearing and good sound transmission through the continuous wall of the hood portion 140, the rubberized cotton stockinette fabric of the hood portion may be cut away at the respective ear areas thereof and replaced by a much thinner, rubberized, woven fabric cover 173 of relatively greater sound transmission characteristics adhesively secured to the hood portion, as shown in Fig. 10.

*General functioning of the suit*

The hereinabove described construction and arrangement of the protective inflatable suit provides an environment entirely surrounding the wearer during high altitude flight, which environment corresponds as to oxygen content and air pressure to that at a safe, relatively low altitude. The suit makes feasible a safe descent of the wearer from a high altitude such, for example, as about 65,000 feet to a safe lower altitude such as about 12,000 feet, if the airplane is disabled as from structural failure or from gunfire. Also, the suit is capable of functioning as an exposure suit in an emergency such as when the wearer parachutes and is forced to land in the ocean, since the suit is water-proof and resists the entrance of cold ocean water.

By virtue of the inner head covering 139 and torso covering 21 arrangement, the outer head covering 128 need not be worn continuously over the wearer's head, but can be slipped back off the head without objectionable loss of pressure on the body and major part of the head, when the wearer is within the pressurized cockpit and flying under normal relatively safe conditions such that there is little or no likelihood of emergency use of the suit. This is a decided convenience for those pilots who object to an outer head covering being continuously in place about their head. It also facilitates breathing the outer air when the wearer has parachuted to a suitable safe altitude; since the outer head covering 128 is readily detached by operation of the slide fastener 137 and subsequently lifted back over the head by the wearer.

The length of the torso, arm and leg coverings, respectively, can be conveniently adjusted so as to fit the suit to the particular size of the wearer. The integral dual-wall construction provides improved resistance to burst with relatively lighter weight fabric materials which materials are advantageous for increased flexibility of the suit as a whole. The construction of the torso covering and the leg coverings produces increased flexibility of the suit at its hip regions to facilitate improved mobility of the wearer. The suit has improved ventilation as for cooling purposes, and the described head covering assembly 26 including the multiple oxygen jet nozzle arrangement overcomes effectively the problem of fogging of the visor 129. Thus, the suit protects the life of the wearer from the dangers of high altitude flight.

Variations may be made without departing from the scope of the invention as it is defined in the following claims.

I claim:

1. An inflatable protective suit for incasing the wearer's body in an air-pressurized environment during high altitude flight, said protective suit comprising a torso-enclosing portion with a neck opening therein, an outer head-enclosing portion sealingly connected to the margin of said torso-enclosing portion about said neck opening, and an inner head-enclosing portion of flexible impervious fabric material also sealingly connected to said margin of the torso-enclosing portion and being in spaced independent relation to said outer head-enclosing portion to facilitate turning and tilting movements of the wearer's head relative to the outer head-enclosing portion, said inner head-enclosing portion including an annular diaphragm portion of said fabric material extending in a loose condition inwardly from said margin of the torso-enclosing portion to loosely fit the wearer's neck and a hood of said fabric material including a face opening therein integral with and in continuation of said diaphragm portion and said hood having a shape to closely fit the wearer's head and means to seal against the wearer's face at the peripheral margin of the hood about said face opening so as to subject the wearer's neck and head to the inflating pressure within said torso-enclosing portion.

2. An inflatable protective suit for incasing the wearer's body in an air-pressurized environment during high altitude flight, said protective suit comprising a torso-enclosing portion with a neck opening, an outer head-enclosing portion including a rigid transparent frontal viewing portion sealingly connected to the margin of said torso-enclosing portion about said neck opening, and an inner head-enclosing portion of flexible impervious fabric material also sealingly connected to said margin of the torso-enclosing portion and being in spaced independent relation to said outer head-enclosing portion to facilitate turning and tilting movements of the wearer's head relative to the outer head-enclosing portion, said inner head-enclosing portion including an annular diaphragm portion of said fabric material extending in loose condition inwardly from said margin of the torso-enclosing portion to loosely fit the wearer's neck and a hood of said fabric material including a face opening therein integral with and in continuation of said diaphragm portion, said hood having a shape to closely fit the wearer's head and resilient sealing means about the periphery of said face opening to seal against the wearer's face, and said hood having an elongated slit extending substantially centrally thereof from a position therein adjacent said resilient sealing means and in the upper front region of the hood to a position rearwardly thereof at the lower back region of the hood and sealing slide fastener means separably joining the margins thereof along said slit to enclose the same, whereby the wearer's neck and head are subject to the inflating pressure within said torso-enclosing portion.

3. An inflatable protective suit for incasing the wearer's body in an air-pressurized environment during high altitude flight, said protective suit comprising a torso-enclosing portion with a neck opening therein, an outer head-enclosing portion including a rigid transparent frontal visor portion sealingly connected to the margin of said torso-enclosing portion about said neck opening, an inner head-enclosing portion of flexible impervious fabric material also sealingly connected to said margin of the torso-enclosing portion and being in spaced independent relation to said outer head-enclosing portion to facilitate turning and tilting movements of the wearer's head relative to the latter portion, said inner head-enclosing portion including an annular diaphragm portion of said fabric material extending in a loose condition inwardly from said margin to loosely fit the wearer's neck and a head covering of said fabric material including a face opening therein integral with and in continuation of said diaphragm portion and head covering having a shape to closely fit about the wearer's head and face, anti-fogging means comprising a plurality of upwardly directed jet nozzles disposed above said diaphragm portion in the space between the outer and inner head-enclosing portions and supported on and interiorly of said outer head-enclosing portion, the said jet nozzles being adjacent and spaced-apart along the lower peripheral margin of said frontal visor portion, and means communicating said anti-fogging means with a source of breathable gas under pressure carried by said suit for directing the gas through said jet nozzles upwardly across the inner surface of said frontal visor portion to maintain the vision of the wearer therethrough.

4. An inflatable protective suit as defined in claim 3 in which said outer head-enclosing portion is also hingedly and detachably connected to said torso-enclosing portion so as to be swingable upwardly and backwardly from about the wearer's head; and in which said anti-fogging means comprises a plurality of small tubes terminating each in one of said jet nozzles and mounted interiorly of and on said outer head-enclosing portion and extending side-by-side along said lower peripheral margin of the frontal visor portion to a position at the rear of said outer head-enclosing portion for swinging movement therewith and connected communicatingly at said position with an external conduit connected to said source of breathable gas under pressure.

5. An inflatable protective suit as defined in claim 3 in which said torso-enclosing portion has a flexible dual conduit in the interior thereof extending from the upper front region thereof to and through said diaphragm portion of the inner head-enclosing portion at the back region thereof and then around in the space between the outer and inner head-enclosing portions and above said diaphragm portion to a position at the lower front region of said outer head-enclosing portion for connection to a face mask, said dual conduit being in communication through the wall of said torso-enclosing portion at said upper front region thereof with the exterior of the suit for connection to a source of oxygen for supplying the oxygen to the face mask and for conducting the exhaust breath of the wearer for the face mask to the outer atmosphere; and in which said diaphragm portion has mounted thereon a pair of spaced-apart check valves one of which being operable to open to the interior space of said outer head-enclosing portion and the other check valve being operable to open the interior space of said torso-enclosing portion so as to normally maintain the internal pressure within said outer head-enclosing portion slightly greater than that within said torso-enclosing portion.

6. An inflatable protective suit of the character described comprising a body-enclosing covering comprising a plurality of superposed plies, the inner of said plies including a flexible textile fabric formed of one set of filamentary elements extending longitudinally of the covering and another set of filamentary elements extending circumferentially of said covering and interlaced with the said one set of filamentary elements in a manner such that the said fabric has lesser extensibility longitudinally of said covering than circumferentially thereof, the outer of said plies including a stress-resistant flexible textile fabric formed of a first set of substantially inextensible filamentary elements extending longitudinally of said covering and a second set of substantially inextensible filamentary elements extending circumferentially of said covering and interlaced with said first set of filamentary elements in a manner such that the fabric formed thereby is of substantially equal inextensibility both longitudinally and circumferentially of the covering, an elastomeric material between said fabric plies uniting the latter throughout their adjacent faces and rendering the covering impervious with the inner face of said inner ply free of said elastomeric material, a plurality of flexible non-extensible band members extending circumferentially of a torso-enclosing portion of said covering including the front and back regions thereof in longitudinally spaced relationship on the exterior thereof, and a second plurality of flexible nonextensible band members extending longitudinally of said torso-enclosing portion including said front and back regions thereof in circumferentially spaced relationship on the exterior thereof, all said band members being secured to said covering throughout their entire extents thereby resisting outward distension and longitudinal lengthening of said torso portion of said covering.

7. An inflatable protective suit of the character described comprising a body-enclosing covering comprising a plurality of superposed plies, the inner of said plies including a flexible textile knitted fabric formed of one set of filamentary elements extending longitudinally of the covering and another set of filamentary elements extending circumferentially of said covering and interlaced with the said one set of filamentary elements in a manner such that the said fabric has lesser extensibility longitudinally of said covering than circumferentially thereof, the outer of said plies including a stress-resistant flexible textile square-woven fabric formed of a first set of substantially inextensible filamentary elements extending longitudinally of said covering and a second set of substantially inextensible filamentary elements extending circumferentially of said covering and interlaced with said first set of filamentary elements in a manner such that the fabric formed thereby is of substantially equal inextensibility both longitudinally and circumferentially of the covering, an elastomeric material between said fabric plies uniting the latter throughout their adjacent faces and rendering the covering impervious with the inner face of said inner ply free of said elastomeric material, a plurality of flexible non-extensible band members extending circumferentially of a torso-enclosing portion of said covering including the front and back regions thereof in longitudinally spaced relationship on the exterior thereof, and a second plurality of flexible non-extensible band members extending longitudinally of said torso-enclosing portion including said front and back regions thereof in circumferentially spaced relationship on the exterior thereof, all said band members being secured to said covering throughout their entire extents thereby resisting outward distension and longitudinal lengthening of said torso portion of said covering.

8. An inflatable protective suit of the character described comprising a body-enclosing covering comprising a plurality of plies, the inner of said plies including a flexible textile knitted fabric formed of one set of filamentary elements extending longitudinally of the covering and another set of filamentary elements extending circumferentially of said covering and interlaced with said one set of filamentary elements in a manner such that the said fabric has lesser extensibility longitudinally of said covering than circumferentially thereof, the outer of said plies including a stress-resistant flexible textile square-woven fabric formed of a first set of substantially inextensible filamentary elements extending longitudinally of said covering and a second set of substantially inextensible filamentary elements extending circumferentially of said covering and interlaced with said first set of filamentary elements in a manner such that the fabric formed thereby is of substantially equal inextensibility both longitudinally and circumferentially of the covering, a continuous layer of elastomeric material between said plies uniting the latter throughout their adjacent faces rendering the covering including said inner ply impervious with the inner face of said inner ply free from said elastomeric material, said body-enclosing covering including torso, arm and leg-enclosing portions, said torso-enclosing portion having in its outer ply a continuous divide extending circumferentially entirely about the torso-enclosing portion at a position therein adjacent yet spaced from the junction thereof with the leg-enclosing portions to provide upper and lower adjacent marginal portions of the outer ply longitudinally spaced-apart at said divide, means detachably engaging and securing together said adjacent marginal portions of the outer ply with a selected space therebetween, said torso-enclosing portion having its inner ply including said impervious elastomeric layer thereon continuous and extending longitudinally from said upper marginal portion to said junction with said leg-enclosing portions in separated relation to the outer ply of said torso-enclosing portion but secured to said upper marginal portion and secured to said leg-enclosing portions at said junction, said inner ply including circumferentially-extending pleats at the region of said divide, the outer ply of said torso-enclosing portion at the lower back region thereof being integrally united with said leg-enclosing portions continuously along said junction with slide fastener means extending generally circumferentially along said junction at the lower front region and from the right hand side to the left hand side of said torso-enclosing portion and secured to said outer ply thereof and to said leg-enclosing portions.

9. An inflatatable protective suit for maintaining the wearer's entire body under an air pressure equivalent to that at a safe relatively low altitude, said protective suit comprising a body-enclosing covering comprising a plurality of superposed plies, the inner of said plies including a flexible stretchable textile fabric united throughout its outer face with a continuous impervious layer of elastomeric material and with the inner face of said fabric free of said elastomeric material, the outer of said plies including a stress-resistant flexible nonstretchable textile fabric contacting said impervious elastomeric layer in the inflated condition of the suit, said body-enclosing covering including a torso-enclosing portion, a pair of arm-enclosing portions joined to said torso-enclosing portion, a pair of leg-enclosing portions joined to said toros-enclosing portion, and means in the torso, arm and leg-enclosing portions intermediate the length of each of said portions and extending circumferentially entirely about each of said portions for adjusting the length of each of said portions to accommodate the particular wearer of the suit, each of said means comprising a circumferentially extending region of the covering in which said inner ply and impervious elastomeric layer thereon are continuous and said outer ply is circumferentially divided with adjacent marginal portions thereof longitudinally spaced-apart, and means detachably engaging and securing together said adjacent marginal portions of the outer ply with a selected space therebetween.

10. An inflatable protective suit for maintaining the wearer's entire body under an air pressure equivalent to that at a safe relatively low altitude, said protective suit comprising a body-enclosing portion comprising a plurality of superposed plies, the inner of said plies including a flexible stretchable textile knitted fabric united throughout its outer face with a continuous impervious layer of elastomeric material and with the inner face of said fabric free of said elastomeric material, the outer of said plies including a stress-resistant flexible nonstretchable textile square-woven fabric contacting said impervious elastomeric layer in the inflated condition of the suit, said body-enclosing portion including a torso-enclosing portion with means in the lower region thereof extending circumferentially entirely about the torso-enclosing portion for adjusting the length thereof, a pair of arm-enclosing portions joined to said torso-enclosing portion each including a flexible elbow joint with circumferentially-extending pleats and means adjacent said joint and extending circumferentially entirely about the arm-enclosing portion for adjusting the length thereof, and a pair of leg-enclosing portions joined to said torso-enclosing portion each including a flexible knee joint with circumferentially-extending pleats and means adjacent the knee joint and extending circumferentially entirely about the leg-enclosing portion for adjusting the length thereof, each of said means comprising a circumferentially extending region of the covering in which said inner ply and impervious elastomeric layer thereon are continuous and said outer ply is circumferentially divided with adjacent marginal portions thereof longitudinally spaced-apart, and means detachably engaging and securing together said adjacent marginal portions of the outer ply with a selected space therebetween.

11. An inflatable protective suit for maintaining the wearer's entire body under an air pressure equivalent to that at a safe relatively low altitude, said protective suit comprising a body-enclosing portion comprising a plurality of superposed plies, the inner of said plies including a flexible stretchable textile knitted fabric united throughout its outer face with a continuous impervious layer of elastomeric material and with the inner face of said fabric free of said elastomeric material, the outer of said plies including a stress-resistant flexible non-stretchable textile square-woven fabric contacting said impervious elastomeric layer in the inflated condition of the suit, said body-enclosing portion including a torso-enclosing portion with means in the lower region thereof extending circumferentially entirely about the torso-enclosing portion for adjusting the length thereof, a pair of arm-enclosing portions rotatively joined to said torso-enclosing portion each including a flexible joint with circumferentially-extending pleats in the upper arm region of the arm-enclosing portion and a flexible elbow joint with circumferentially-extending pleats and means adjacent and below said elbow joint and extending circumferentially entirely about the arm-enclosing portion for adjusting the length thereof, and a pair of leg-enclosing portions joined to said torso-enclosing portion each including a flexible joint with circumferentially-extending pleats in the upper thigh region of the leg-enclosing portion longitudinally spaced from a flexible knee joint with circumferentially-extending pleats and a generally cylindrical portion connecting the thigh and knee joints and secured thereto and means adjacent and below said knee joint and extending circumferentially entirely about the leg-enclosing portion, each of said means comprising a circumferentially extending region of the covering in which said inner ply and impervious elastomeric layer thereon are continuous and said outer ply is circumferentially divided with adjacent marginal portions thereof longitudinally spaced-apart, and means detachably engaging and securing together said adjacent marginal portions of the outer ply and a selected space therebetween.

12. An inflatable protective suit for maintaining the wearer's entire body under an air pressure equivalent to that at a safe relatively low altitude, said protective suit comprising a body-enclosing portion comprising a plurality of superposed plies, the inner of said plies including a flexible stretchable textile knitted fabric united throughout its outer face with a continuous impervious layer of elastomeric material and with the inner face of said fabric free of elastomeric material, the outer of said plies including a stress-resistant flexible non-stretchable textile square-woven fabric contacting said impervious elastomeric layer in the inflated condition of the suit, said body-enclosing portion including torso, arm and leg-enclosing portions, each said arm-enclosing portion including a flexible elbow joint with circumferentially-extending pleats therein at least in the front region of the arm-enclosing portion, and each said leg-enclosing portion including at its upper thigh region a flexible joint including circumferentially-extending pleats at least at the front of the leg-enclosing portion, a flexible knee joint spaced from the flexible upper thigh joint including circumferentially-extending pleats at least at the back of the leg-enclosing portion, and a generally cylindrical portion extending between and united with said flexible upper thigh joint and said flexible knee joint.

13. An inflatable protective suit of the character described comprising a body-enclosing covering comprising a plurality of superposed plies, the inner of said plies including flexible textile knitted fabric formed of one set of filamentary elements extending longitudinally of the covering and another set of filamentary elements extending circumferentially of said covering and interlaced with said one set of filamentary elements in a manner such that said fabric has lesser extensibility longitudinally of the covering than circumferentially thereof, the outer of said plies including stress-resistant flexible textile square-woven fabric formed of a first set of substantially inextensible filamentary elements extending longitudinally of said covering and a second set of substantially inextensible filamentary elements extending circumferentially of the covering and interlaced with said first set of filamentary elements in a manner such that the fabric formed thereby is of substantially equal inextensibility both longitudinally and circumferentially of the covering, an elastomeric material between said plies united with the adjacent face of the inner ply throughout the area thereof and rendering the covering impervious with the inner face of the inner ply free of said elastomeric material, the outer ply of the covering contacting said elastomeric material in the inflated condition of the suit, said body-enclosing covering including a torso-enclosing portion, an arm-enclosing portion joined to said torso-enclosing portion at its right hand side and a second arm-enclosing portion joined to said torso-enclosing portion at its left hand side, right and left leg-enclosing portions joined to said torso-enclosing portion, inlet fitting means attached to the multi-ply wall of said torso-enclosing portion at a position in the left hand side area thereof spaced from the junction of both the left arm-enclosing portion and the left leg-enclosing portion with said torso-enclosing portion, and exhaust fitting means attached to said multi-ply wall of said torso-enclosing portion at a position in the right hand side area thereof and spaced from the junction of both the right arm-enclosing portion and the right leg-enclosing portion with said torso-enclosing portion, said inlet and said exhaust fitting means each being in communication through said multi-ply wall with the interior of the torso-enclosing portion for conducting inflating air under pressure to and from the said covering to distend the latter and to cool the wearer's body.

References Cited in the file of this patent

UNITED STATES PATENTS

| | | |
|---|---|---|
| 593,175 | Heyman | Nov. 2, 1897 |
| 2,222,971 | Wright | Nov. 26, 1940 |
| 2,307,213 | Goldston | Jan. 5, 1943 |
| 2,308,411 | Wolfson | Jan. 12, 1943 |
| 2,365,779 | Schwab | Dec. 26, 1944 |
| 2,401,990 | Orman | June 11, 1946 |
| 2,402,820 | Kitchen | June 25, 1946 |
| 2,410,632 | Colley et al. | Nov. 5, 1946 |
| 2,417,177 | Richou | Mar. 11, 1947 |
| 2,478,126 | Ostby | Aug. 2, 1949 |
| 2,507,463 | Smith | May 9, 1950 |
| 2,669,726 | Meisel | Feb. 23, 1954 |

FOREIGN PATENTS

| | | |
|---|---|---|
| 21,819 | Great Britain | 1912 |
| 577,101 | Great Britain | May 6, 1946 |
| 591,852 | Great Britain | Sept. 1, 1947 |
| 592,033 | Great Britain | Sept. 5, 1947 |

UNITED STATES PATENT OFFICE
CERTIFICATION OF CORRECTION

Patent No. 2,966,155                    December 27, 1960

Carroll P. Krupp

It is hereby certified that error appears in the above numbered patent requiring correction and that the said Letters Patent should read as corrected below.

Column 5, line 61, for "tide" read -- tied --; column 18, line 53, after "open" insert -- to --; column 20, lines 42 and 43, for "toros-enclosing", each occurrence, read -- torso-enclosing --; column 21, line 55, for "and" read -- with --.

Signed and sealed this 30th day of May 1961.

(SEAL)
Attest:

ERNEST W. SWIDER
Attesting Officer

DAVID L. LADD
Commissioner of Patents